US012600159B2

(12) United States Patent
Eid et al.

(10) Patent No.: US 12,600,159 B2
(45) Date of Patent: Apr. 14, 2026

(54) REUSABLE COMPOSITE STENCIL FOR SPRAY PROCESSES

(71) Applicant: Intel Corporation, Santa Clara, CA (US)

(72) Inventors: Feras Eid, Chandler, AZ (US); Wenhao Li, Chandler, AZ (US); Jiraporn Seangatith, Chandler, AZ (US); Paul Diglio, Gaston, OR (US); Xavier Brun, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 903 days.

(21) Appl. No.: 17/680,839

(22) Filed: Feb. 25, 2022

(65) Prior Publication Data

US 2023/0271445 A1 Aug. 31, 2023

(51) Int. Cl.
*B41N 1/24* (2006.01)

(52) U.S. Cl.
CPC .................................... *B41N 1/248* (2013.01)

(58) Field of Classification Search
CPC ...................................................... B41N 1/248
See application file for complete search history.

(56) References Cited

U.S. PATENT DOCUMENTS 4,378,953 A * 4/1983 Winn ............... B29D 11/00634 359/350
4,802,945 A * 2/1989 Opina .................. H05K 3/4061 156/247
5,147,397 A * 9/1992 Christ ...................... A61L 27/50 623/6.46
5,461,003 A * 10/1995 Havemann ........ H01L 21/02337 438/666
5,512,131 A * 4/1996 Kumar .................. H01L 21/768 438/782
5,559,055 A * 9/1996 Chang ................. H01L 21/7682 438/619
5,869,880 A * 2/1999 Grill ................... H01L 23/5222 257/508
5,900,160 A * 5/1999 Whitesides ............ G02B 6/124 216/33
6,250,219 B1 * 6/2001 Garvin ...................... B44C 1/24 101/127

(Continued)

FOREIGN PATENT DOCUMENTS

DE 10104726 A1 * 8/2002 ............. H10F 10/14
JP H04202677 A * 7/1992

(Continued)

*Primary Examiner* — Travis M Figg
(74) *Attorney, Agent, or Firm* — Essential Patents Group, LLP

(57) ABSTRACT

Reusable composite stencils for spray processes, particularly for spray processes used in the fabrication of integrated circuit devices, may be fabricated having a permanent core and at least one sacrificial material layer. Thus, in operation, when a predetermined amount of the sacrificial material layer has been ablated away by a material being sprayed in the spray process, the remaining sacrificial material layer may be removed and reapplied to its original thickness. Therefore, the permanent core, which is usually expensive and/or difficult to fabricate, may be repeatedly reused.

20 Claims, 9 Drawing Sheets

(56) References Cited

U.S. PATENT DOCUMENTS

| | | | | |
|---|---|---|---|---|
| 6,776,094 | B1 * | 8/2004 | Whitesides | G02B 5/1857 101/379 |
| 6,805,809 | B2 * | 10/2004 | Nuzzo | B81C 1/0046 216/54 |
| 6,833,040 | B2 * | 12/2004 | Raphel | B29C 41/02 156/247 |
| 7,282,240 | B1 * | 10/2007 | Jackman | B82Y 40/00 427/282 |
| 9,881,794 | B1 * | 1/2018 | Su | H01L 21/76816 |
| 2003/0070569 | A1 * | 4/2003 | Bulthaup | B82Y 10/00 101/127 |
| 2003/0111167 | A1 * | 6/2003 | Raphel | B29C 41/02 156/230 |
| 2004/0040653 | A1 * | 3/2004 | Nuzzo | B81C 1/0046 428/166 |
| 2005/0062165 | A1 * | 3/2005 | Saenger | H01L 21/7682 438/622 |
| 2006/0040492 | A1 * | 2/2006 | Goodner | H01L 21/76807 438/622 |
| 2009/0004841 | A1 * | 1/2009 | Supriya | H01L 21/486 438/618 |
| 2009/0197054 | A1 * | 8/2009 | Chauhan | H05K 3/1225 156/247 |
| 2012/0097329 | A1 * | 4/2012 | Stern | G03F 7/12 264/447 |
| 2016/0181115 | A1 * | 6/2016 | deVilliers | H01L 21/32139 438/695 |
| 2018/0233408 | A1 * | 8/2018 | Burns | H01L 21/76816 |
| 2021/0028256 | A1 * | 1/2021 | Sonoda | H05B 33/12 |
| 2023/0271445 | A1 * | 8/2023 | Eid | B41N 1/248 101/127 |

FOREIGN PATENT DOCUMENTS

| | | | | | |
|---|---|---|---|---|---|
| KR | 100442413 | B1 | * | 7/2004 | B81C 1/00111 |
| TW | 201418875 | A | * | 5/2014 | B82Y 40/00 |
| WO | WO-9954786 | A1 | * | 10/1999 | C23C 14/042 |
| WO | WO-03031136 | A2 | * | 4/2003 | G03F 7/0002 |
| WO | WO-2006121906 | A1 | * | 11/2006 | B82Y 40/00 |
| WO | WO-2008070087 | A2 | * | 6/2008 | G03F 7/0002 |
| WO | WO-2011146912 | A2 | * | 11/2011 | B41C 1/148 |

* cited by examiner

REUSABLE COMPOSITE STENCIL FOR SPRAY PROCESSES

TECHNICAL FIELD

Embodiments of the present description generally relate to the field of integrated circuit package or device fabrication, and, more specifically, to reusable composite stencils, comprising a permanent core and at least one sacrificial material layer, for spray processes used in the fabrication of integrated circuit devices.

BACKGROUND

The integrated circuit industry is continually striving to produce ever faster, smaller, and thinner integrated circuit packages for use in various electronic products, including, but not limited to, computer servers and portable products, such as portable computers, electronic tablets, cellular phones, digital cameras, and the like.

As a part of this effort, the integrated circuit industry has developed innovative processing techniques, such a spray processes, for depositing various material layers and features for the fabrication of components in integrated circuit devices. Many spray processes, such as thermal spray or cold spray processes, require the use of stencils for the creation of a pattern in the deposited material layers. As will be understood to those skilled in the art, a stencil is usually a mask, having open areas therethrough, that physically blocks the particles being sprayed except through the open areas. For example, the stencil may be placed on a substrate and the entire stencil area sprayed, to create a pattern on the substrate corresponding to the open areas through the stencil. However, as the particles are generally abrasive, this process also causes the stencil to wear out after one or a few spray cycles, requiring replacement of the stencil.

In one approach, stencils may be made from expensive materials, such as stainless steel, wherein the stencils are patterned with expensive precision methods, such as high accuracy lasers or lithography and microfabrication, further increasing the cost of each stencil. As these stencils are relatively expensive, the cost of replacing these stencils frequently, as a consumable during the spray process, may become financially prohibitive.

In an alternative approach, the stencil may be made by using a masking tape. The masking tape is usually made of a polymer material with an adhesive, such as polyimide (optionally with polyethylene terephthalate backing film) with a silicone adhesive. Although such stencils are relatively inexpensive, they generally cannot be used to create fine features since they would require precise placement on the substrate which is not usually feasible. Furthermore, applying the masking tape to the substrate directly may contaminate the substrate, since the successful cleaning of the adhesive residue from the masking tape may require chemicals and/or high temperatures that are not compatible with the substrate material. Moreover, applying and removing masking tapes can be difficult and/or costly in high volume manufacturing.

Thus, there is a need for a cost-effective stencil for use in spray processes in the fabrication of integrated circuit devices.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. It is understood that the accompanying drawings depict only several embodiments in accordance with the present disclosure and are, therefore, not to be considered limiting of its scope. The disclosure will be described with additional specificity and detail through use of the accompanying drawings, such that the advantages of the present disclosure can be more readily ascertained, in which:

DETAILED DESCRIPTION

Figure 1:
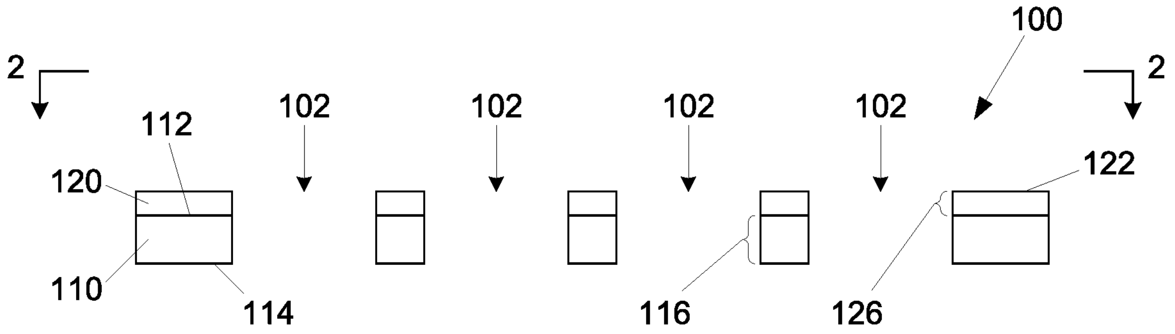
FIG. 1 is a side cross-sectional view of a composite stencil, according to one embodiment of the present description.

In the following detailed description, reference is made to the accompanying drawings that show, by way of illustration, specific embodiments in which the claimed subject matter may be practiced. These embodiments are described in sufficient detail to enable those skilled in the art to practice the subject matter. It is to be understood that the various embodiments, although different, are not necessarily mutually exclusive. For example, a particular feature, structure, or characteristic described herein, in connection with one embodiment, may be implemented within other embodiments without departing from the spirit and scope of the claimed subject matter. References within this specification to "one embodiment" or "an embodiment" mean that a particular feature, structure, or characteristic described in connection with the embodiment is included in at least one implementation encompassed within the present description. Therefore, the use of the phrase "one embodiment" or "in an embodiment" does not necessarily refer to the same embodiment. In addition, it is to be understood that the location or arrangement of individual elements within each disclosed embodiment may be modified without departing from the spirit and scope of the claimed subject matter. The following detailed description is, therefore, not to be taken in a limiting sense, and the scope of the subject matter is defined only by the appended claims, appropriately interpreted, along with the full range of equivalents to which the appended claims are entitled. In the drawings, like numerals refer to the same or similar elements or functionality throughout the several views, and that the elements depicted therein are not necessarily to scale with one another, rather individual elements may be enlarged or reduced in order to more easily comprehend the elements in the context of the present description.

The terms "over", "to", "between" and "on" as used herein may refer to a relative position of one layer with respect to other layers. One layer "over" or "on" another layer or bonded "to" another layer may be directly in contact with the other layer or may have one or more intervening layers. One layer "between" layers may be directly in contact with the layers or may have one or more intervening layers.

The term "package" generally refers to a self-contained carrier of one or more dice, where the dice are attached to the package substrate, and may be encapsulated for protection, with integrated or wire-boned interconnects between the dice and leads, pins or bumps located on the external portions of the package substrate. The package may contain a single die, or multiple dice, providing a specific function. The package is usually mounted on a printed circuit board for interconnection with other packaged integrated circuits and discrete components, forming a larger circuit.

Here, the term "cored" generally refers to a substrate of an integrated circuit package built upon a board, card or wafer comprising a non-flexible stiff material. Typically, a small printed circuit board is used as a core, upon which integrated circuit device and discrete passive components may be soldered. Typically, the core has vias extending from one side to the other, allowing circuitry on one side of the core to be coupled directly to circuitry on the opposite side of the core. The core may also serve as a platform for building up layers of conductors and dielectric materials.

Here, the term "coreless" generally refers to a substrate of an integrated circuit package having no core. The lack of a core allows for higher-density package architectures, as the through-vias have relatively large dimensions and pitch compared to high-density interconnects.

Here, the term "land side", if used herein, generally refers to the side of the substrate of the integrated circuit package closest to the plane of attachment to a printed circuit board, motherboard, or other package. This is in contrast to the term "die side", which is the side of the substrate of the integrated circuit package to which the die or dice are attached.

Here, the term "dielectric" generally refers to any number of non-electrically conductive materials that make up the structure of a package substrate. For purposes of this disclosure, dielectric material may be incorporated into an integrated circuit package as layers of laminate film or as a resin molded over integrated circuit dice mounted on the substrate.

Here, the term "metallization" generally refers to metal layers formed over and through the dielectric material of the package substrate. The metal layers are generally patterned to form metal structures such as traces and bond pads. The metallization of a package substrate may be confined to a single layer or in multiple layers separated by layers of dielectric.

Here, the term "bond pad" generally refers to metallization structures that terminate integrated traces and vias in integrated circuit packages and dies. The term "solder pad" may be occasionally substituted for "bond pad" and carries the same meaning.

Here, the term "solder bump" generally refers to a solder layer formed on a bond pad. The solder layer typically has a round shape, hence the term "solder bump".

Here, the term "substrate" or "interposer" generally refers to a planar platform comprising dielectric and metallization structures. The substrate mechanically supports and electrically couples one or more IC dies on a single platform, with encapsulation of the one or more IC dies by a moldable dielectric material. The substrate generally comprises solder bumps as bonding interconnects on both sides. One side of the substrate, generally referred to as the "die side", comprises solder bumps for chip or die bonding. The opposite side of the substrate, generally referred to as the "land side", comprises solder bumps for bonding the package to a printed circuit board.

Here, the term "assembly" generally refers to a grouping of parts into a single functional unit. The parts may be separate and are mechanically assembled into a functional unit, where the parts may be removable. In another instance, the parts may be permanently bonded together. In some instances, the parts are integrated together.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, magnetic or fluidic connection between the things that are connected or an indirect connection, through one or more passive or active intermediary devices.

The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The vertical orientation is in the z-direction and it is understood that recitations of "top", "bottom", "above" and "below" refer to relative positions in the z-dimension with the usual meaning. However, it is understood that embodiments are not necessarily limited to the orientations or configurations illustrated in the figure.

The terms "substantially," "close," "approximately," "near," and "about," generally refer to being within +/−10% of a target value (unless specifically specified). Unless otherwise specified the use of the ordinal adjectives "first," "second," and "third," etc., to describe a common object, merely indicate that different instances of like objects to which are being referred and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Views labeled "cross-sectional", "profile" and "plan" correspond to orthogonal planes within a cartesian coordinate system. Thus, cross-sectional and profile views are taken in the x-z plane, and plan views are taken in the x-y plane. Typically, profile views in the x-z plane are cross-sectional views. Where appropriate, drawings are labeled with axes to indicate the orientation of the figure.

The embodiments of the present description relate to reusable composite stencils for spray processes, particularly for spray processes used in the fabrication of integrated circuit devices. The reusable composite stencils may comprise a permanent core and at least one sacrificial material layer. Thus, in operation, the sacrificial material layer protects the permanent core, until a predetermined amount of the sacrificial material layer has been ablated away by the material being sprayed. The remaining sacrificial material layer may be removed and reapplied to its original thickness. Thus, the permanent core, which is usually more expensive and/or difficult to fabricate, may be repeatedly reused.

As shown in FIG. 1, a composite stencil 100 may comprise a permanent core 110, having a first surface 112 and an opposing second surface 114, and a first sacrificial material layer 120 on the first surface 112 of the permanent core 110, wherein the first sacrificial material layer 120 has an outer surface 122 that is opposite the first surface 112 of the permanent core 110. The composite stencil 100 may include at least one stencil opening 102 that may extend from the outer surface 122 of the first sacrificial material layer 120, through the first sacrificial material layer 120, and through the permanent core 110 to the second surface 114 thereof. The portions of the stencil openings 102 extending through the permanent core 110 may be hereinafter referred to as core openings 116 and the portions of the stencil openings 102 extending through the first sacrificial material layer 120 may be hereinafter referred to as first sacrificial material layer openings 126.

In one embodiment of the present description, the permanent core 110 may be made of a metal material, including, but not limited to, copper, aluminum, stainless steel, nickel, gold, silver, tungsten, titanium, tin, alloys thereof and with other materials, and the like. In a further embodiment of the present description, the permanent core 110 may be made of non-metals, including, but not limited to, silicon, glass, ceramics (such as aluminum nitride), porcelain, and the like. In an additional embodiment of the present description, the core openings 116 may be formed or patterned with a precision machining technique, such as laser ablation. In still a further embodiment of the present description, the core openings 116 may be formed or patterned with microfabrication processes, such as lithography and etching. In yet a further embodiment of the present description, the core openings 116 may include fine features in the 10-to-500-micron range.

In one embodiment of the present description, the first sacrificial material layer 120 may be a polymer material, including, but not limited to polyimide, polybenzoxazoles, photoresist materials (such as acrylic and methacrylic polymers), and the like. In an embodiment of the present description, the first sacrificial material layer 120 may be spin coated onto the first surface 112 of the permanent core 110. In a further embodiment of the present description, the first sacrificial material layer 120 may be a multi-layer film, such as an adhesive layer, such as an acrylic adhesive or a silicon adhesive, and a backing polymeric film layer, such as polyimide, polyethylene terephthalate, and the like.

Figure 2:
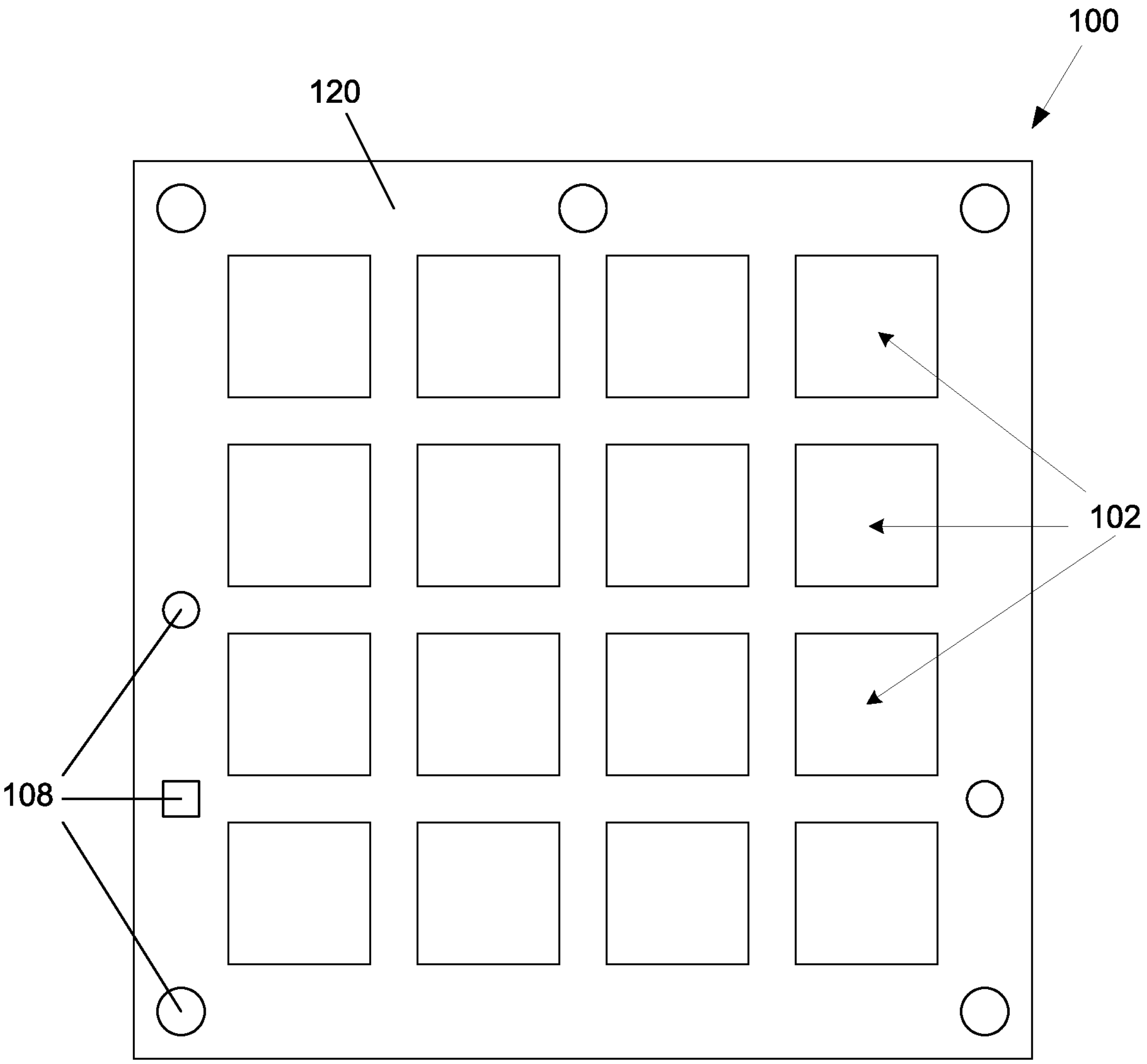
FIG. 2 is a top plan view of the composite stencil along line 2-2 of FIG. 1, according to an embodiment of the present description.

FIG. 2 illustrates a top plan view along line 2-2 of FIG. 1. As illustrated, the stencil openings 102 of the composite stencil 100 may have any desired configuration, such as the illustrated uniform row and column configuration. Although the stencil openings 102 are shown as squares, the embodiments of the present description are not so limited, and can be any appropriate shape, including, but not limited to, uniform or non-uniform rectangles, triangles, circles, curved shapes, and the like. As further illustrated, in further embodiments of the present description, the composite stencil 100 may include features 108 for aligning and/or securing the composite stencil 100 to a substrate (not shown) to be sprayed or to the spray equipment (not shown) itself, as will be understood to those skilled in the art.

Figure 3:
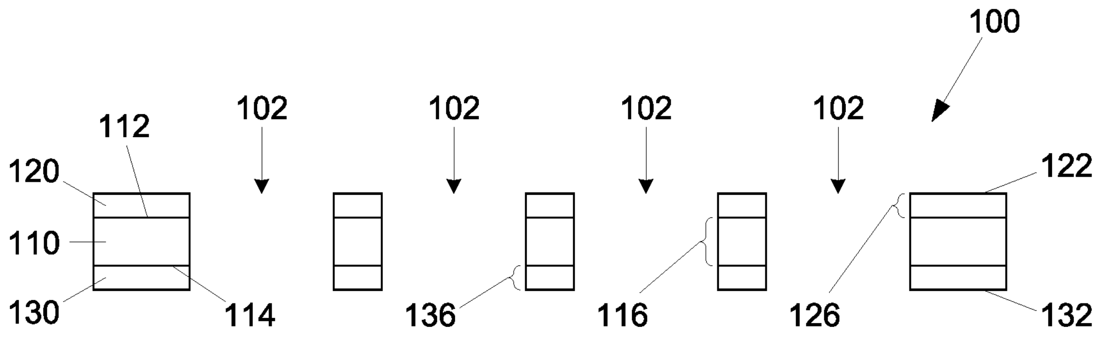
FIG. 3 is a side cross-sectional view of a composite stencil, according to another embodiment of the present description.

Although FIG. 1 illustrates the composite stencil 100 having the first sacrificial material layer 120 on only one surface, i.e., first surface 112 of the permanent core 110, the embodiments of the present description are not so limited. In another embodiment, as shown in FIG. 3, the composite stencil 100 may include a second sacrificial material layer 130 on the second surface 114 of the permanent core 110, wherein the at least one stencil opening 102 further extends through the second sacrificial material layer 130 to an outer surface 132 thereof. The portions of the stencil openings 102 extending through the second sacrificial material layer 130 may be hereinafter referred to as second sacrificial material layer openings 136. In one embodiment of the present description, the first sacrificial material layer 120 may be the same material as the second sacrificial material layer 130. In another embodiment of the present description, the first sacrificial material 120 may be a different material from the second sacrificial material layer 130.

The embodiments of the present description, such as shown in FIG. 3, may help increase the time that the composite stencil 100 can be put into service continuously before it needs to be taken out of service to have the first sacrificial material layer 120 and the second sacrificial material layer 130 reapplied. For example, the composite stencil 100 may be used with the first sacrificial material layer 120 oriented to face the direction of material spray until a predetermined amount of the first sacrificial material layer 120 has been ablated away. The composite stencil 100 may then be flipped and oriented such that the second sacrificial material layer 130 is oriented to face the direction of material spray until a predetermined amount of the second sacrificial material layer 130 has been ablated away. The composite stencil 100 may then be removed from the spray process equipment, and the remaining first sacrificial material layer 120 and the remaining second sacrificial material layer 130 may be removed and replaced with new sacrificial material layers. Thus, the embodiments of FIG. 3 may double the service time of the composite stencil 100.

Figure 4:
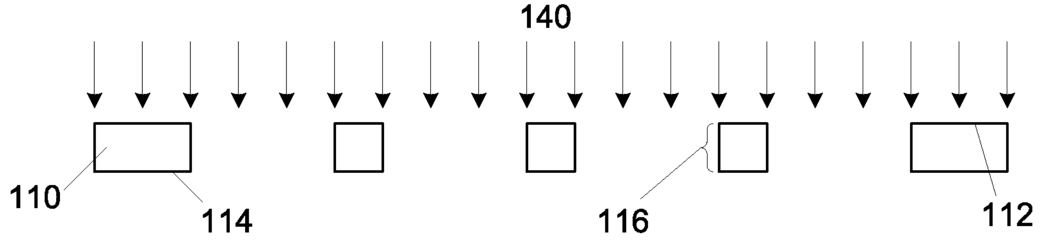
FIGS. 4-8 are side cross-sectional views of a process of fabricating a composite stencil, according to an embodiment of the present description.
Figure 5:
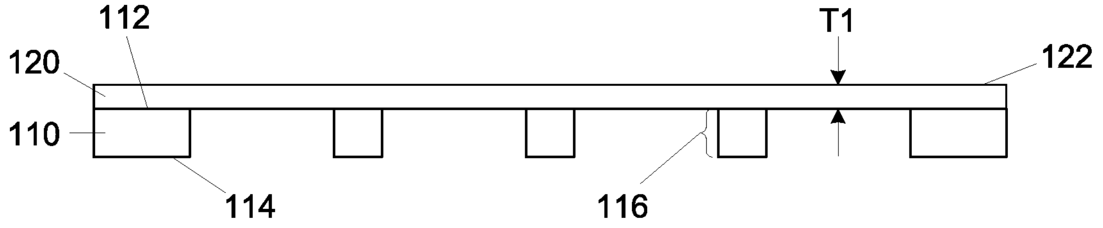
Figure 6:
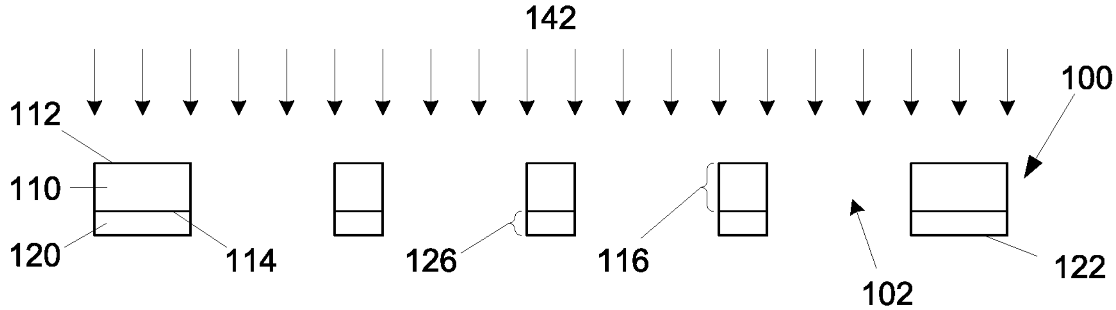

FIGS. 4-8 illustrate a process for fabrication of the composite stencil 100 (see FIG. 1). As shown in FIG. 4, the permanent core 110 may be formed with at least one core opening 116 extending from the first surface 112 to the second surface 114 thereof. The at least one core opening 116 may be formed using precision machining or microfabrication (generically illustrated with arrows 140), as previously discussed. As shown in FIG. 5, the first sacrificial material layer 120 may be coated onto the first surface 112 of the permanent core 110, such as by forming a blanket coat by lamination, deposition, spin coating, and the like, wherein the first sacrificial material layer 120 has an initial thickness of T1. As shown in FIG. 6, the structure of FIG. 5 may be flipped and the first sacrificial material layer 120 may be etched (shown generically as arrows 142) using the permanent core 110 as a hard mask to form the first sacrificial material layer openings 126 and, thereby, form the composite stencil openings 102, as well as the composite stencil 100.

Figure 7:
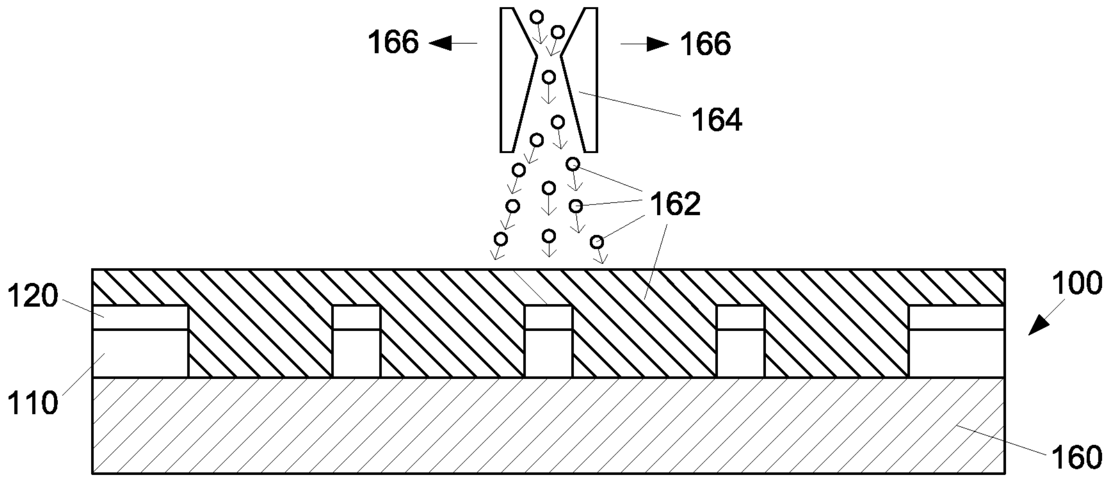
Figure 8:
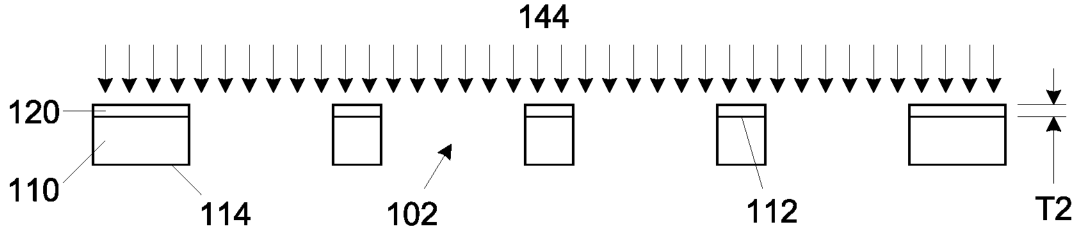

As shown in FIG. 7, the composite stencil 100 may be used in a spray process, wherein the composite stencil 100 is positioned on a substrate 160 and a coating material 162 is sprayed through a nozzle 164 (such as a convergent/divergent nozzle) to contact the substrate 160 through the composite stencil openings 102 (see FIG. 6), wherein the first sacrificial material layer 120 is oriented toward the nozzle 164. It is noted that the coating material 162 is illustrated as material particles with arrows and as a deposited mass on the composite stencil 100 and the substrate 160. The nozzle 164 may be moved (shown as arrows 166) across the substrate 160 during the spray process. When the first sacrificial material layer 120 has been ablated away to a predetermined final thickness of T2, the composite stencil 100 may be removed from the spray process, as shown in FIG. 8. The remaining first sacrificial material layer 120 (see FIG. 8) may then be removed, such as by etching (shown generically as arrows 144), as also shown in FIG. 8. The reclaimed permanent core 110 is then returned to the process, wherein the steps shown in FIG. 4 to FIG. 8 are repeated. It is noted that although the materials and processes used for creating the permanent core 110 may be expensive, the fact that the permanent core 110 is only fabricated once and used over the lifetime of the spray process, while the less expensive first sacrificial material layer 120 gets reapplied, may make the composite stencil 100 cost effective and may minimize the added cost to the spray process.

Figure 9:
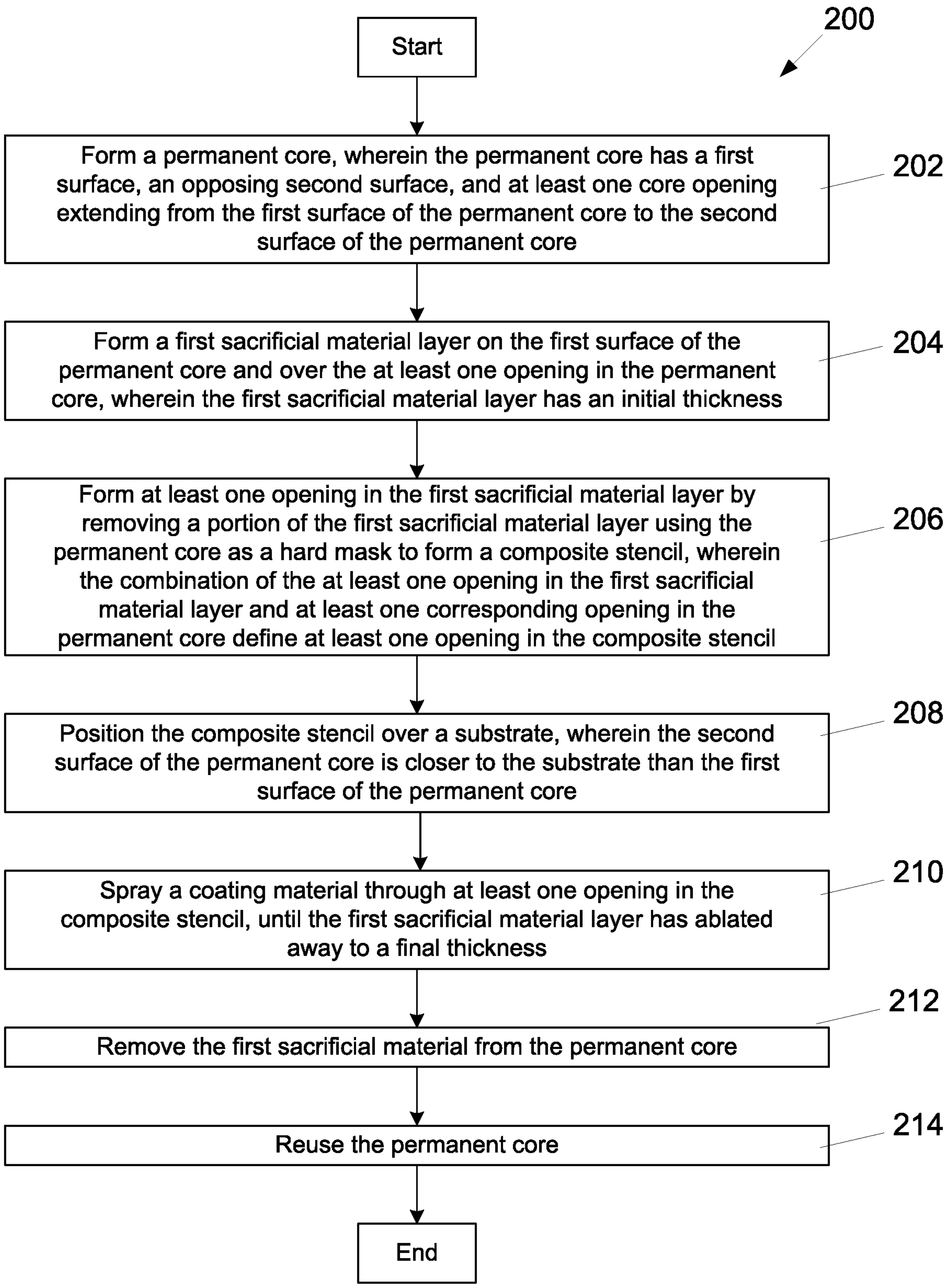
FIGS. 9-12 are flow diagrams of methods of fabricating composite stencils, according to various embodiments of the present description.

FIG. 9 is a flow chart of a process 200 of fabricating a composite stencil according to an embodiment of the present description. As set forth in block 202, a permanent core may be formed having a first surface, an opposing second surface, and at least one opening extending from the first surface of the permanent core to the second surface of the permanent core. A first sacrificial material layer may be formed on the first surface of the permanent core and over the at least one opening in the permanent core, wherein the first sacrificial material layer has an initial thickness, as set forth in block 204. As set forth in block 206, at least one opening may be formed in the first sacrificial material layer by removing a portion of the first sacrificial material layer using the permanent core as a hard mask to form a composite stencil, wherein the combination of the at least one opening in the first sacrificial material layer and at least one corresponding opening in the permanent core define at least one opening in the composite stencil. The composite stencil may be positioned over a substrate, wherein the second surface of the permanent core is closer to the substrate than the first surface of the permanent core, as set forth in block 208. As set forth in block 210, a coating material may be sprayed through the at least one opening in the composite stencil, until the first sacrificial material layer has been ablated away to a predetermined final thickness. The remaining first sacrificial material layer may be removed from the permanent core, as set forth in block 212. As set forth in block 214, the permanent core may be reused, such as by returning it to the process at block 204, wherein the process thereafter is repeated.

Figure 10:
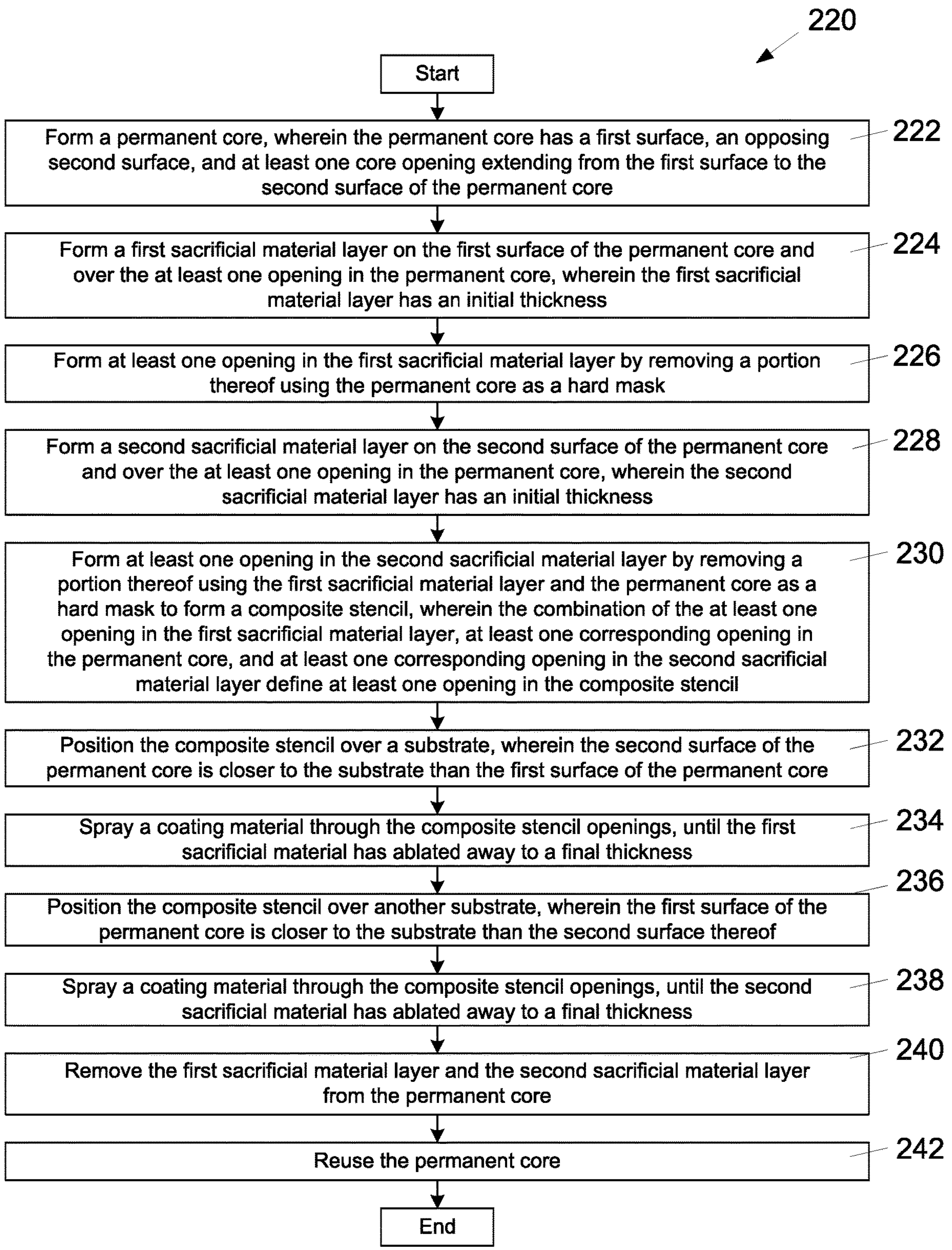

FIG. 10 is a flow chart of a process 220 of fabricating a composite stencil according to another embodiment of the present description. As set forth in block 222, a permanent core may be formed having a first surface, an opposing second surface, and at least one core opening extending from the first surface of the permanent core to the second surface of the permanent core. A first sacrificial material layer may be formed on the first surface of the permanent core and over the at least one opening in the permanent core, wherein the first sacrificial material layer has an initial thickness, as set forth in block 224. As set forth in block 226, at least one opening may be formed in the first sacrificial material layer by removing a portion of the first sacrificial material layer using the permanent core as a hard mask. A second sacrificial material layer may be coated onto the second surface of the permanent core and over the at least one opening in the permanent core, wherein the second sacrificial material layer has an initial thickness, as set forth in block 228. As set forth in block 230, the permanent core may be flipped and at least one opening may be formed in the the second sacrificial material layer by removing of portion of the second sacrificial material layer using the first sacrificial material layer and the permanent core as a hard mask to form a composite stencil, wherein the combination of the at least one opening in the first sacrificial material layer, at least one corresponding opening in the permanent core, and at least one corresponding opening in the second sacrificial material layer define at least one opening in the composite stencil. The composite stencil may be positioned over a substrate, wherein the second surface of the permanent core is closer to the substrate than the first surface of the permanent core, as set forth in block 232. As set forth in block 234, a coating material may be sprayed through the at least one opening in the composite stencil. When the first sacrificial material layer has been ablated away to a predetermined final thickness, the composite stencil may be flipped and positioned over another substrate, wherein the first surface of the permanent core is closer to the substrate than the second surface of the permanent core, as set forth in block 236. As set forth in block 238, the coating material may be sprayed through the composite stencil openings. When the second sacrificial material layer has been ablated away to a predetermined final thickness, the remaining first sacrificial material layer and remaining second sacrificial material layer may be removed from the permanent core, as set forth in block 240. As set forth in block 242, the permanent core may be reused, such as by returning it to the process at block 224, wherein the process thereafter is repeated.

Although the embodiments shown and described with regard to FIGS. 4-10 related to the first sacrificial material layer and the second sacrificial material layer, if present, being formed with a blanket coating method, the embodiments of the present description are not so limited. In other embodiments, the first sacrificial material layer and the second sacrificial material layer, if present, may be formed by a capillary coating technique, wherein the first surface of the permanent core is touched to a liquid sacrificial material, which, by capillary action, adheres thereto to form the first sacrificial material layer and inherently forms the first sacrificial material layer openings. Likewise, if a second sacrificial material layer is formed, the second surface of the permanent core is touched to the liquid sacrificial material, which, by capillary action, adheres thereto to form the second sacrificial material layer and inherently forms the second sacrificial material layer openings.

Figure 11:
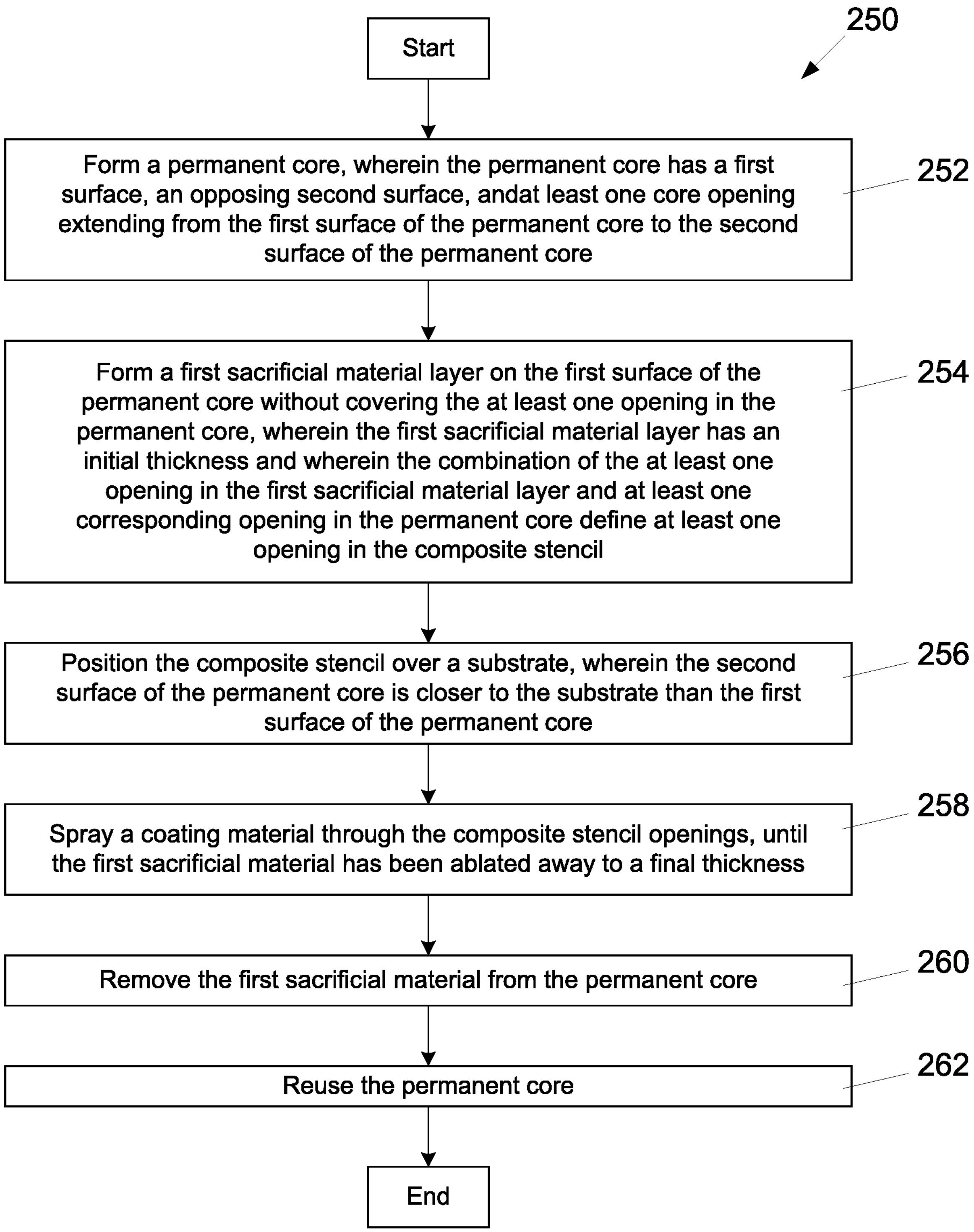

FIG. 11 is a flow chart of a process 250 of fabricating a composite stencil according to an embodiment of the present description. As set forth in block 252, a permanent core may be formed having a first surface, an opposing second surface, and at least one opening extending from the first surface of the permanent core to the second surface of the permanent core. A first sacrificial material layer may be formed on the first surface of the permanent core without covering the at least one opening in the permanent core to form a composite stencil, wherein the first sacrificial material layer has an initial thickness and wherein the combination of at least one opening in the first sacrificial material layer and a corresponding opening in the permanent core define at least one opening in the composite stencil, as set forth in block 254. As set forth in block 256, the composite stencil may be positioned over a substrate, wherein the second surface of the permanent core is closer to the substrate than the first surface of the permanent core. A coating material may be sprayed through the at least one opening in the composite stencil, as set forth in block 258, until the first sacrificial material layer has been ablated away to a predetermined final thickness. The remaining first sacrificial material layer may be removed from the permanent core, as set forth in block 260. As set forth in block 262, the permanent core may be reused, such as by returning to the process at block 254, wherein the process thereafter is repeated.

Figure 12:
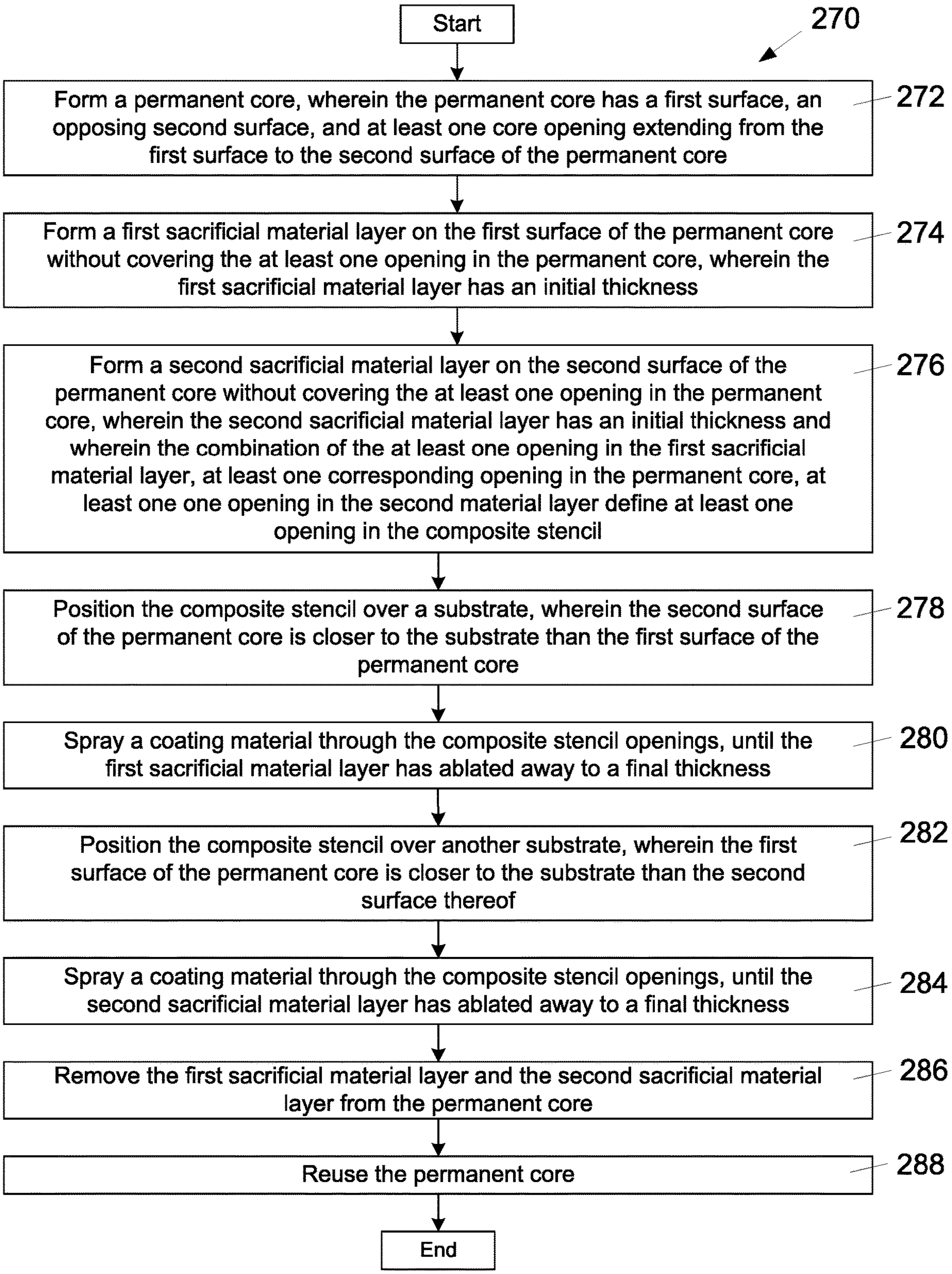

FIG. 12 is a flow chart of a process 270 of fabricating a composite stencil according to an embodiment of the present description. As set forth in block 272, a permanent core may be formed having a first surface, an opposing second surface, and at least one opening extending from the first surface of the permanent core to the second surface of the permanent core. A first sacrificial material layer may be formed on the first surface of the permanent core without covering the at least one opening in the permanent core, wherein the first sacrificial material layer has an initial thickness, as set forth in block 274. As set forth in block 276, a second sacrificial material layer may be formed on the second surface of the permanent core without covering the at least one opening in the permanent core to form a composite stencil, wherein the second sacrificial material layer has an initial thickness and wherein the combination of at least one opening in the first sacrificial material layer, a corresponding opening in the permanent core, and a corresponding opening in the second sacrificial material layer define at least one opening in the composite stencil. The composite stencil may be positioned over a substrate, wherein the second surface of the permanent core is closer to the substrate than the first surface of the permanent core, as set forth in block 278. As set forth in block 280, a coating material may be sprayed through the at least one opening in the composite stencil, until the first sacrificial material layer has been ablated away to a predetermined final thickness. The composite stencil may be flipped and positioned over another substrate, wherein the first surface of the permanent core is closer to the substrate than the second surface of the permanent core, as set forth in block 282. As set forth in block 284, the coating material may be sprayed through the composite stencil openings, until the second sacrificial material layer has been ablated away to a predetermined final thickness. The remaining first sacrificial material layer and remaining second sacrificial material layer may be removed from the permanent core, as set forth in block 286. As set forth in block 288, the permanent core may be reused, such as by returning it to the process at block 274, wherein the process thereafter is repeated.

Figure 13:
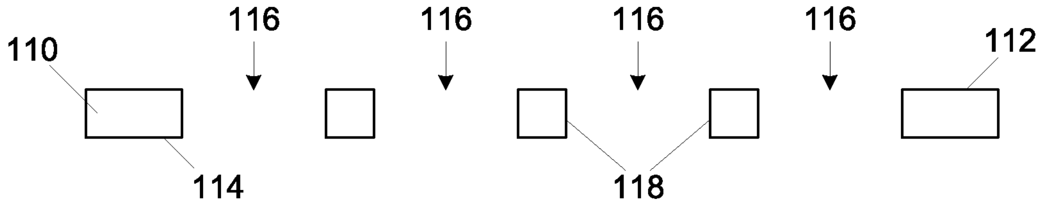
FIGS. 13 and 14 are side cross-sectional views of a process of fabricating a composite stencil, according to another embodiment of the present description.
Figure 14:
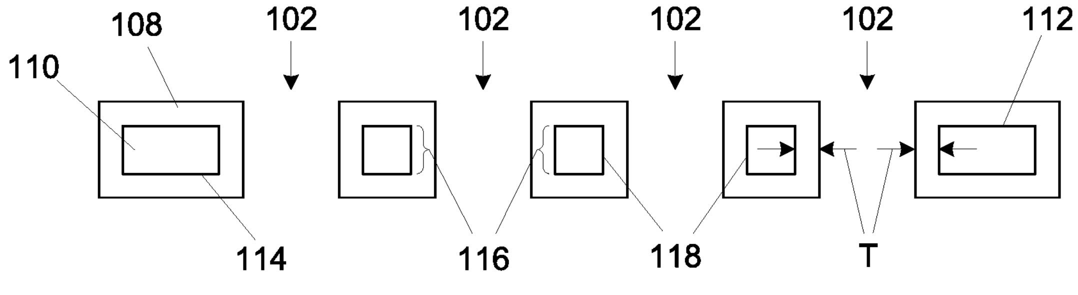

In another embodiment of the present description, the permanent core may be immersion coated with a sacrificial material layer. FIG. 13 illustrates the permanent core 110, which may be fabricated in the manner described in FIG. 4, wherein the at least one openings 116 are defined by at least one sidewall 118 extending from the first surface 112 of the permanent core 110 and the second surface 114 of the permanent core 110. As shown in FIG. 14, the permanent core 110 may be immersed in a material to form the sacrificial material layer 180, which may coat the first surface 112 of the permanent core 110, the second surface 114 of the permanent core 110, and the at least one sidewall 118 of the openings 116 in the permanent core 110, wherein a portion of the sacrificial material layer abutting the first surface of the permanent core defines the first sacrificial material layer 120 (see FIG. 3) and wherein a portion of the sacrificial material layer abutting the second surface of the permanent core defines the second sacrificial material layer 130 (see FIG. 3). As will be understood to those skilled in the art, the openings 116 may be sized to compensate for the thickness T of the first sacrificial material layer 120.

Figure 15:
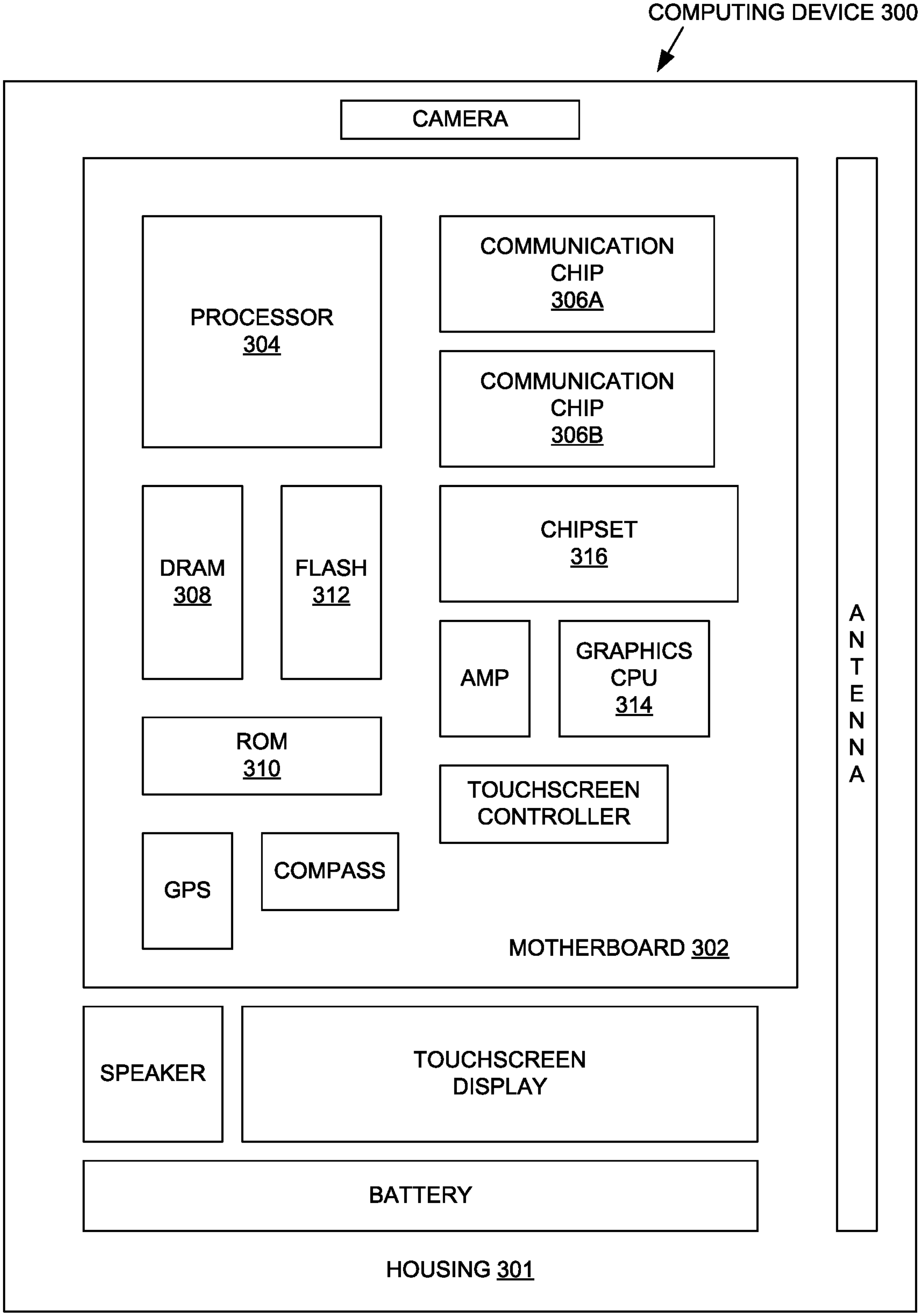
FIG. 15 is an electronic system, according to one embodiment of the present description.

FIG. 15 illustrates an electronic or computing device 300 in accordance with one implementation of the present description. The computing device 300 may include a housing 301 having a board 302 disposed therein. The computing device 300 may include a number of integrated circuit components, including but not limited to a processor 304, at least one communication chip 306A, 306B, volatile memory 308 (e.g., DRAM), non-volatile memory 310 (e.g., ROM), flash memory 312, a graphics processor or CPU 314, a digital signal processor (not shown), a crypto processor (not shown), a chipset 316, an antenna, a display (touchscreen display), a touchscreen controller, a battery, an audio codec (not shown), a video codec (not shown), a power amplifier (AMP), a global positioning system (GPS) device, a compass, an accelerometer (not shown), a gyroscope (not shown), a speaker, a camera, and a mass storage device (not shown) (such as hard disk drive, compact disk (CD), digital versatile disk (DVD), and so forth). Any of the integrated circuit components may be physically and electrically coupled to the board 302. In some implementations, at least one of the integrated circuit components may be a part of the processor 304.

The communication chip enables wireless communications for the transfer of data to and from the computing device. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip or device may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device may include a plurality of communication chips. For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

The term "processor" may refer to any device or portion of a device that processes electronic data from registers and/or memory to transform that electronic data into other electronic data that may be stored in registers and/or memory.

At least one of the integrated circuit components may be fabricated using the composite stencil of any of the embodiments of present description.

In various implementations, the computing device may be a laptop, a netbook, a notebook, an ultrabook, a smartphone, a tablet, a personal digital assistant (PDA), an ultra-mobile PC, a mobile phone, a desktop computer, a server, a printer, a scanner, a monitor, a set-top box, an entertainment control unit, a digital camera, a portable music player, or a digital video recorder. In further implementations, the computing device may be any other electronic device that processes data.

It is understood that the subject matter of the present description is not necessarily limited to specific applications illustrated in FIGS. 1-15. The subject matter may be applied to other integrated circuit devices and assembly applications, as well as any appropriate electronic application, as will be understood to those skilled in the art.

The follow examples pertain to further embodiments and specifics in the examples may be used anywhere in one or more embodiments, wherein Example 1 is an apparatus comprising a composite stencil, wherein the composite stencil includes at least one opening extending therethrough and wherein the composite stencil comprises a permanent core, wherein the permanent core includes a first surface, an opposing second surface, and at least one opening extending from the first surface of the permanent core to the second surface of the permanent core; and a first sacrificial material layer on the first surface of the permanent core.

In Example 2, the subject matter of Example 1 can optionally include the first sacrificial material layer having an outer surface opposite the first surface of the permanent core and at least one opening extending from the outer surface of the first sacrificial material layer to the at least one opening of the permanent core, and wherein the at least one opening in the permanent core and at least one corresponding opening in the first sacrificial material layer define the at least one opening in the composite stencil.

In Example 3, the subject matter of Example 1 can optionally include the first sacrificial material layer having an outer surface opposite the first surface of the permanent core and at least one opening extending from the outer surface of the first sacrificial material layer to the at least one opening of the permanent core; and further comprising a second sacrificial material layer on the second surface of the permanent core, wherein the second sacrificial material layer has an outer surface opposite the second surface of the permanent core and at least one opening extending from the outer surface of the second sacrificial material layer to the at least one opening of the permanent core, and wherein the at least one opening in the permanent core, at least one corresponding opening in the first sacrificial material layer, and at least one corresponding opening in the second sacrificial material layer define the at least one opening in the composite stencil.

In Example 4, the subject matter of Example 1 can optionally include the at least one opening of the permanent core being defined by at least one sidewall, and wherein a sacrificial material layer is on the first surface of the permanent core, on the at least one sidewall of the permanent core, and on the second surface of the permanent core, wherein a portion of the sacrificial material layer abutting the first surface of the permanent core defines the first sacrificial material layer and wherein a portion of the sacrificial material layer abutting the second surface of the permanent core defines the second sacrificial material layer.

In Example 5, the subject matter of Example 1 can optionally include the permanent core comprising a metal material selected from the group consisting of copper, aluminum, stainless steel, nickel, gold, silver, tungsten, titanium, and tin.

In Example 6, the subject matter of any of Examples 1 can optionally include the permanent core comprising a non-metal material selected from the group consisting of silicon, glass, ceramic, and porcelain.

In Example 7, the subject matter of Example 1 can optionally include the first sacrificial material layer comprising a material selected from the group consisting of polyimide, polybenzoxazole, acrylic polymer, methacrylic polymer, and polyethylene terephthalate.

In Example 8, the subject matter of any of Examples 3 can optionally include the second sacrificial material layer comprising a material selected from the group consisting of polyimide, polybenzoxazole, acrylic polymer, methacrylic polymer, and polyethylene terephthalate.

Example 9 is a method, comprising forming a permanent core, wherein the permanent core has a first surface, an opposing second surface, and at least one opening extending from the first surface of the permanent core to the second surface of the permanent core; forming a first sacrificial material layer on the first surface of the permanent core, wherein the first sacrificial material layer has an initial thickness; forming at least one opening in the first sacrificial material layer to form a composite stencil, wherein the combination of the at least one opening in the first sacrificial material layer and at least one corresponding opening in the permanent core define at least one opening in the composite stencil; positioning the composite stencil over a substrate, wherein the second surface of the permanent core is closer to the substrate than the first surface of the permanent core; spraying a coating material through the at least one opening in the composite stencil, until the first sacrificial material layer has been ablated away to a final thickness; removing the first sacrificial material layer from the permanent core; and reusing the permanent core.

In Example 10, the subject matter of Example 9 can optionally include forming a first sacrificial material layer on the first surface of the permanent core further comprising forming the first sacrificial material layer over the at least one opening in the permanent core, and wherein forming the at least one opening in the first sacrificial material layer comprises forming the at least one opening in the first sacrificial material layer by removing a portion of the first sacrificial material layer using the permanent core as a hard mask.

In Example 11, the subject matter of Example 9 can optionally include forming the first sacrificial material layer on the first surface of the permanent core and forming the at least one opening in first sacrificial material layer comprising forming the first sacrificial material layer on the first surface of the permanent core without covering the at least one opening in the permanent core.

In Example 12, the subject matter of Example 11 can optionally include forming the first sacrificial material layer on the first surface of the permanent core without covering the least one opening in the permanent core comprising capillary coating the first sacrificial material layer.

Example 13 is a method comprising forming a permanent core may be formed having a first surface, an opposing second surface, and at least one opening extending from the first surface of the permanent core to the second surface of the permanent core; forming a first sacrificial material layer on the first surface of the permanent core, wherein the first sacrificial material layer has an initial thickness; forming at least one opening in the first sacrificial material layer extending to the at least one opening in the permanent core; forming a second sacrificial material layer on the second surface of the permanent core, wherein the second sacrificial material layer has an initial thickness; forming at least one opening in the second sacrificial material layer to form a composite stencil, wherein the combination of the at least one opening in the first sacrificial material layer, at least one opening in the permanent core, and the at least one opening in the second sacrificial material layer define at least one opening in the composite stencil; positioning the composite stencil over a substrate, wherein the second surface of the permanent core is closer to the substrate than the first surface of the permanent core; spraying a coating material through the at least one opening in the composite stencil, until the first sacrificial material layer has ablated away to a final thickness; positioning the composite stencil over another substrate, wherein the first surface of the permanent core is closer to the substrate than the second surface of the permanent core; spraying a coating material through the at least one opening in the composite stencil, until the second sacrificial material layer has ablated away to a final thickness; removing the first sacrificial material layer and the second sacrificial material layer; and reusing the permanent core.

In Example 14, the subject matter of Example 13 can optionally include forming a first sacrificial material layer on the first surface of the permanent core further comprising forming the first sacrificial material layer over the at least one opening in the permanent core, and wherein forming the at least one opening in the first sacrificial material layer comprises forming the at least one opening in the first sacrificial material layer by removing a portion of the first sacrificial material layer using the permanent core as a hard mask.

In Example 15, the subject matter of Example 13 can optionally include the second sacrificial material layer on the second surface of the permanent core further comprising forming the second sacrificial material layer over the at least one opening in the permanent core, and wherein forming the at least one opening in the second sacrificial material layer comprises forming the at least one opening in the second sacrificial material layer by removing a portion of the second sacrificial material layer using the first sacrificial material layer and the permanent core as a hard mask.

In Example 16, the subject matter of Example 13 can optionally include the first sacrificial material layer on the first surface of the permanent core further comprising forming the first sacrificial material layer on the first surface of the permanent core without covering the at least one opening in the permanent core.

In Example 17, the subject matter of Example 16 can optionally include forming the first sacrificial material layer on the first surface of the permanent core without covering the least one opening in the permanent core comprising capillary coating the first sacrificial material layer.

In Example 18, the subject matter of Example 13 can optionally include forming a second sacrificial material layer on the second surface of the permanent core further comprising forming the second sacrificial material layer on the second surface of the permanent core without covering the at least one opening in the permanent core.

In Example 19, the subject matter of Example 18 can optionally include forming the second sacrificial material layer on the second surface of the permanent core without covering the least one opening in the permanent core comprising capillary coating the second sacrificial material layer.

In Example 20, the subject matter of Example 13 can optionally include forming the first sacrificial material layer and forming the second sacrificial material layer comprising immersion coating the permanent core with a sacrificial material layer, wherein a portion of the sacrificial material layer abutting the first surface of the permanent core defines the first sacrificial material layer and wherein a portion of the sacrificial material layer abutting the second surface of the permanent core defines the second sacrificial material layer.

Having thus described in detail embodiments of the present invention, it is understood that the invention defined by the appended claims is not to be limited by particular details set forth in the above description, as many apparent variations thereof are possible without departing from the spirit or scope thereof.

What is claimed is:

1. An apparatus, comprising:
- a composite stencil, wherein the composite stencil includes at least one opening extending therethrough and wherein the composite stencil comprises:
  - a permanent core, wherein the permanent core includes a first surface, an opposing second surface, and at least one opening extending from the first surface of the permanent core to the second surface of the permanent core;
  - a first sacrificial material layer on the first surface of the permanent core, wherein the first sacrificial material layer has an outer surface opposite the first surface of the permanent core and at least one opening extending from the outer surface of the first sacrificial material layer to the at least one opening of the permanent core; and
  - a second sacrificial material layer on the second surface of the permanent core, wherein the second sacrificial material layer has an outer surface opposite the second surface of the permanent core and at least one opening extending from the outer surface of the second sacrificial material layer to the at least one opening of the permanent core, and wherein the at least one opening in the permanent core, at least one corresponding opening in the first sacrificial material layer, and at least one corresponding opening in the second sacrificial material layer define the at least one opening in the composite stencil.

2. The apparatus of claim 1, wherein the at least one opening of the permanent core is defined by at least one sidewall, and wherein a sacrificial material layer is on the first surface of the permanent core, on the at least one sidewall of the permanent core, and on the second surface of the permanent core, wherein a portion of the sacrificial material layer abutting the first surface of the permanent core defines the first sacrificial material layer and wherein a portion of the sacrificial material layer abutting the second surface of the permanent core defines the second sacrificial material layer.

3. The apparatus of claim 1, wherein the permanent core comprises a metal material selected from the group consisting of copper, aluminum, stainless steel, nickel, gold, silver, tungsten, titanium, and tin.

4. The apparatus of claim 1, wherein the permanent core comprises a non-metal material selected from the group consisting of silicon, glass, ceramic, and porcelain.

5. The apparatus of claim 1, wherein the first sacrificial material layer comprises a material selected from the group consisting of polyimide, polybenzoxazole, acrylic polymer, methacrylic polymer, and polyethylene terephthalate.

6. The apparatus of claim 1, wherein the second sacrificial material layer comprises another material selected from the group consisting of polyimide, polybenzoxazole, acrylic polymer, methacrylic polymer, and polyethylene terephthalate.

7. The apparatus of claim 1, wherein the first sacrificial material layer and the second sacrificial material layer are the same material.

8. A composite stencil, comprising:
- a permanent core, wherein the permanent core comprises a first surface, an opposing second surface, and at least one opening extending from the first surface of the permanent core to the second surface of the permanent core;
- a first sacrificial material layer on the first surface of the permanent core, wherein the first sacrificial material layer has an outer surface opposite the first surface of the permanent core and at least one opening extending from the outer surface of the first sacrificial material layer to the at least one opening of the permanent core; and
- a second sacrificial material layer on the second surface of the permanent core, wherein the second sacrificial material layer has an outer surface opposite the second surface of the permanent core and at least one opening extending from the outer surface of the second sacrificial material layer to the at least one opening of the permanent core, and wherein the at least one opening in the permanent core, at least one corresponding opening in the first sacrificial material layer, and at least one corresponding opening in the second sacrificial material layer define at least one opening in the composite stencil extending therethrough.

9. The composite stencil of claim 8, wherein the at least one opening of the permanent core is defined by at least one sidewall, and wherein a sacrificial material layer is on the first surface of the permanent core, on the at least one sidewall of the permanent core, and on the second surface of the permanent core, wherein a portion of the sacrificial material layer abutting the first surface of the permanent core defines the first sacrificial material layer and wherein a portion of the sacrificial material layer abutting the second surface of the permanent core defines the second sacrificial material layer.

10. The composite stencil of claim 8, wherein the permanent core comprises a metal material selected from the group consisting of copper, aluminum, stainless steel, nickel, gold, silver, tungsten, titanium, and tin.

11. The composite stencil of claim 8, wherein the permanent core comprises a non-metal material selected from the group consisting of silicon, glass, ceramic, and porcelain.

12. The composite stencil of claim 8, wherein the first sacrificial material layer comprises a material selected from the group consisting of polyimide, polybenzoxazole, acrylic polymer, methacrylic polymer, and polyethylene terephthalate.

13. The composite stencil of claim 8, wherein the first sacrificial material layer and the second sacrificial material layer are the same material.

14. An apparatus, comprising:

a composite stencil comprising an opening extending therethrough, the composite stencil comprising:

a permanent core comprising a first surface, an opposing second surface, and an opening extending from the first surface of the permanent core to the second surface of the permanent core;

a first sacrificial material layer on the first surface of the permanent core, wherein the first sacrificial material layer has an outer surface opposite the first surface of the permanent core and an opening extending from the outer surface of the first sacrificial material layer to the opening of the permanent core; and a second sacrificial material layer on the second surface of the permanent core, wherein the second sacrificial material layer has an outer surface opposite the second surface of the permanent core and an opening extending from the outer surface of the second sacrificial material layer to the opening of the permanent core, and wherein the opening in the permanent core, corresponding opening in the first sacrificial material layer, and corresponding opening in the second sacrificial material layer define the opening in the composite stencil.

15. The apparatus of claim 14, wherein the opening of the permanent core is defined by a sidewall, and wherein a sacrificial material layer is on the first surface of the permanent core, on the sidewall of the permanent core, and on the second surface of the permanent core, wherein a portion of the sacrificial material layer abutting the first surface of the permanent core defines the first sacrificial material layer and wherein a portion of the sacrificial material layer abutting the second surface of the permanent core defines the second sacrificial material layer.

16. The apparatus of claim 14, wherein the permanent core comprises a metal material selected from the group consisting of copper, aluminum, stainless steel, nickel, gold, silver, tungsten, titanium, and tin.

17. The apparatus of claim 14, wherein the permanent core comprises a non-metal material selected from the group consisting of silicon, glass, ceramic, and porcelain.

18. The apparatus of claim 14, wherein the first sacrificial material layer comprises a material selected from the group consisting of polyimide, polybenzoxazole, acrylic polymer, methacrylic polymer, and polyethylene terephthalate.

19. The apparatus of claim 18, wherein the second sacrificial material layer comprises another material selected from the group consisting of polyimide, polybenzoxazole, acrylic polymer, methacrylic polymer, and polyethylene terephthalate.

20. The apparatus of claim 14, wherein the first sacrificial material layer and the second sacrificial material layer are the same material.

* * * * *